Nov. 16, 1965

E. R. BERNIER 3,217,996

TAPE TRANSPORT MECHANISM

Filed April 2, 1962

Edgar R. Bernier

*INVENTOR*

United States Patent Office 3,217,996
Patented Nov. 16, 1965

3,217,996
TAPE TRANSPORT MECHANISM
Edgar R. Bernier, Nashua, N.H., assignor to Sanders Associates, Inc., Nashua, N.H., a corporation of Delaware
Filed Apr. 2, 1962, Ser. No. 184,291
5 Claims. (Cl. 242—55.12)

This invention relates to tape recorders and more particularly to miniature, low power, instant start tape recorders.

The present invention is especially useful in connection with instant start recorders of the type having a tape moving mechanism which operates continuously but is adapted to be selectively engageable with the tape. With this kind of recorder, tape movement starts so quickly that tape need be used only when signals are present for recording. However, there is one complication due to the fact that the end of the tape is permanently anchored to the supply reel so as to facilitate reverse playback or rewinding without need to manually rethread the tape. With such an arrangement, it is deemed necessary to terminate driving of the tape before the end is reached in order to avoid rupture of the tape due to the abrupt restraining force exerted by the supply reel. Rupture of the tape is especially critical where the recorder is in flight and not available for repairs. While auxiliary control systems such as a photoelectric system may be embodied in the recorder to effect automatic disengagement of the tape moving mechanism when the end is reached, they have the disadvantage of adding to the overall weight and size of the recorder and also of introducing additional problems of maintenance, reliability and power consumption.

Accordingly, the primary object of the present invention is to provide a system which eliminates tape breakage while allowing the tape transport drive mechanism to operate continuously in readiness to provide immediate tape movement on command.

A more particular object is to provide a simple system for rendering a tape moving mechanism ineffective to continue driving a tape in the same direction after the end has been reached, the simple system being applicable to known instant start tape recorders and having the advantages of not adding to the weight or size of the recorder and of permitting the motor driving the capstan to idle while the tape is stopped.

The underlying concepts of the invention are to have a tape leader which (a) is adapted to reduce the force exerted on the driving capstan by its pinch roller and (b) is lubricated, so as to cause slippage between it and the driving capstan, thereby allowing the tape to be halted while the capstan continues to turn.

A recorder embodying the present invention may comprise a two-reel tape storage system, a motor driven tape transport mechanism comprising a continuously rotating capstan, a pinch roller for the capstan, means for selectively forcing the pinch roller against the rotating capstan whereby to pinch and drive an interposed tape from one reel to the other, means for holding the tape stationary when the pinch roller is not in tape-pinching position, and a tape leader adapted to slip relative to the capstan when under the limited pinch roller pressure, whereby when the leader moves into engagement with the capstan, the tape may be halted but the capstan can continue to rotate freely and the motor driving the capstan can idle with little or no load thereon.

Other objects and advantages of the present invention will be readily appreciated and understood as reference is had to the following detailed description when considered in connection with the accompanying drawings, wherein.

Figure 1:
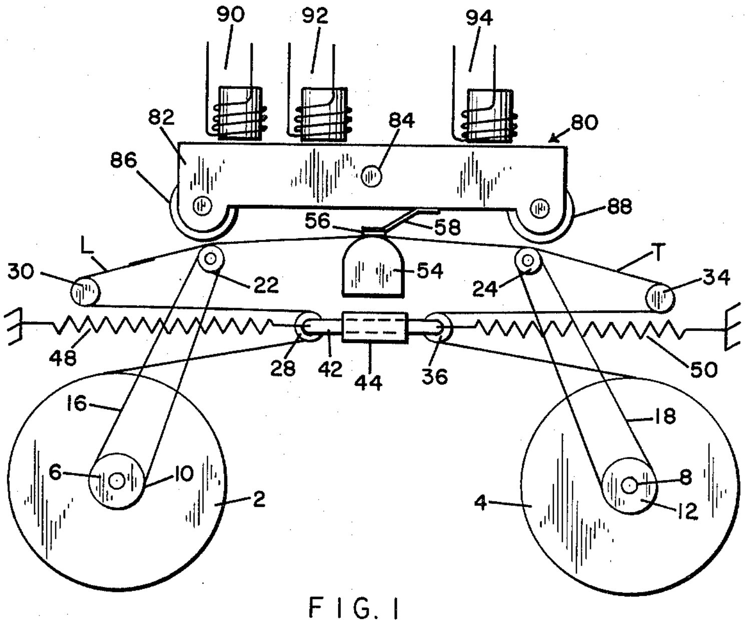
FIG. 1 is a plan view of a preferred embodiment of the present invention.

The preferred embodiment shown in the drawings is of the type where recording is done in one direction at a first relatively low speed and playback is done in the reverse direction at a relatively high speed, whereby a second recording may be started without any rewinding as soon as playback has been completed. Accordingly, although the present invention is concerned primarily with the task of stopping the tape when one end is reached, it is to be understood that the recorder may also embody means for automatically causing reverse movement of the tape immediately after it has stopped because the end has been reached.

Figures 2, 3:
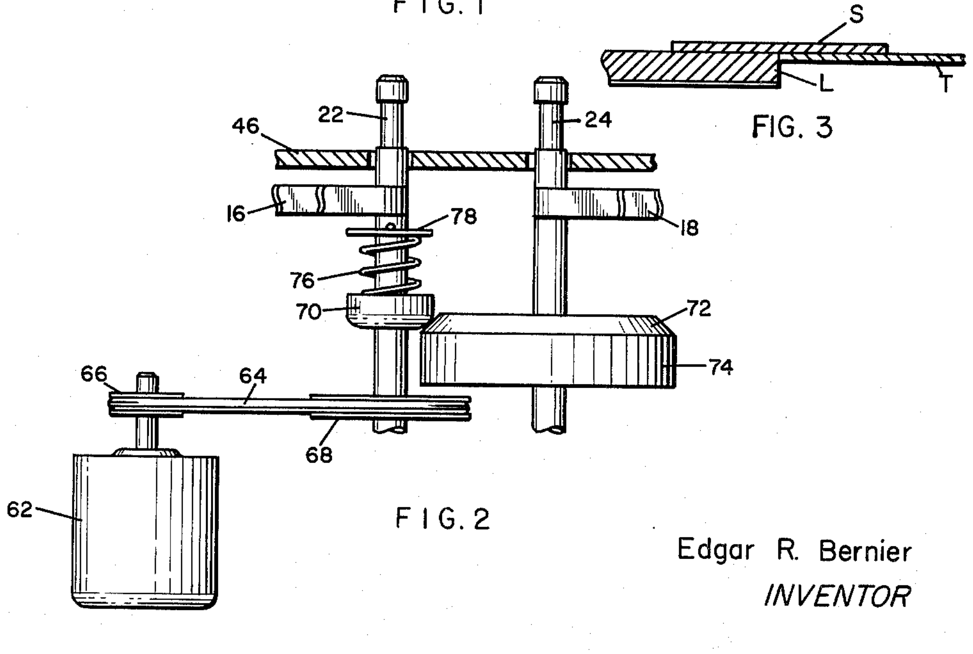
FIG. 2 is a simplified side view of the capstan drive system.
FIG. 3 is a cross-sectional view on an enlarged scale of the tape-tape leader splice, the relative thickness of the lubricant coating on the tape leader being exaggerated for convenience of description.

Referring now to FIG. 1, there is shown a recording device with spaced apart tape reels 2 and 4 mounted on spindles 6 and 8, respectively. Affixed to these spindles are pulleys 10 and 12 which permit them to be driven by belts 16 and 18 from capstans 22 and 24. Reels 2 and 4 function to supply and take up recording tape T which is transported by one or the other of the capstans in the manner herein after described. Passage of tape T between reels 2 and 4 is guided by a series of spaced rollers 28, 30, 34 and 36. Rollers 28 and 36 are attached to a carriage 42 which is slidably supported by a guide member 44 which is attached to the tape bed 46 (FIG. 2). The guide member 44 supports carriage 42 for movement longitudinally of itself. The opposite ends of the carriage 42 are connected to balanced springs 48 and 50, each spring having its other end attached to the tape bed. Springs 48 and 50 maintain the carriage 42 in a central position (see FIG. 1) in the absence of any unbalancing force.

Located between the capstans 22 and 24 is a magnetic head 54. In the preferred embodiment herein illustrated, magnetic head 54 is both a read and write head. However, as far as the invention is concerned, the exact function of the head is irrelevant. It may be solely a read head or a write head. Moreover, additional heads may also be present. The tape is held against the magnetic head 54 by a friction pad 56 which is biased by a leaf spring 58. The leaf spring 58 may be attached to any suitable supporting member.

The capstans 22 and 24 rotate counterclockwise and clockwise respectively and at different speeds. In the preferred embodiment, the capstan 22 is the playback capstan and is designed to rotate at a linear speed of 15 inches per second while the capstan 24 is the record capstan and is adapted to rotate at a linear speed of 3.75 inches per second. Referring to FIG. 2, the capstans are driven from a D.C. motor 62. Motor 62 drives capstan 22 through a simple belt drive comprising a belt 64 mounted on a pair of pulleys 66 and 68. The latter is affixed to the output shaft of motor 62 and the latter is attached to the capstan 22. Capstan 24 is driven from capstan 22 through a friction clutch which comprises a disk 70 mounted on capstan 22 and having a curved edge which makes contact with a truncated conical surface 72 on a flywheel 74 which is affixed to the capstan 24. The annular disk 70 is held against the flywheel 74 by a compression spring 76 which is restrained by a flange 78 on capstan 22. The disk 70 makes point contact with the truncated conical surface of the flywheel 74, thereby avoiding the "tooth contact" flutter inherent in gear drives. Flywheel 74 has a diameter larger than the diameter of the disk 70 by an amount sufficient to drive capstan 24 at a speed ratio of 1:4 relative to capstan 22.

It is believed to be apparent from the foregoing discussion that capstans 22 and 24 can exert opposite driving forces on tape T, both directly and through reels 2 and 4 respectively. At this point, it is to be observed that the tape is always under a slight force by both capstans due to being held against them by tension. If one or the other of the opposing forces predominates, the tape will move in the direction of the predominating force. In standby condition, i.e., when the tape is not pressed tight against either capstan by a pinch roller, any difference of force is overcome by the spring-loaded friction pad 56 which presses the tape against the recording head 54. The loading of spring 58 is such that the friction force which the pad exerts on the tape is just large enough to overcome the driving force on the tape which is the resultant of the forces exerted by the capstans directly or through the belts 16 and 18. Thus, the capstans will slip while the tape is held stationary by pad 56. In standby condition, rotation of the capstans is attended and permitted by slippage of belts 16 and 18. This slippage permits the motor 62 to idle with little or no load so long as the recorder is in standby condition. Slippage of belts 16 and 18 also permit movement of reels 2 and 4 in tape-unwinding direction when the tape is being transported by capstans 24 and 22 respectively.

Movement of the tape under the influence of one or the other of the capstans 22 and 24 is determined and controlled by a pinch roller assembly 80. This pinch roller assembly comprises an armature in the form of an elongated arm 82 pivoted intermediate its ends as indicated at 84. Armature arm 82 carries two pinch rollers 86 and 88, one at each end. The pinch roller 86 is positioned so as to be movable into pinching engagement with capstan 22. The second pinch roller 88 is designed to have the same action relative to capstan 24. Armature 82 also acts as a support for leaf spring 58, the latter being anchored thereto. The arrangement is such that movement of the armature on its pivot does not cause any material change in the loading on the spring. Hence, the pressure exerted by pad 56 is substantially constant. The armature 82 is positioned proximate to three solenoids 90, 92 and 94. The solenoids 90 and 92 are located adjacent to each other on one side of the pivot 84 while the other solenoid 94 is located on the other side of the same pivot, whereby energization of solenoid 90 or 92 will produce a magnetic force which urges the armature to rotate clockwise while energization of solenoid 94 will produce a magnetic force which urges the armature to rotate counterclockwise. When either solenoid 90 or 92 is energized, the tape T will move at the relatively slow speed of record capstan 24. When solenoid 94 is energized, tape T will move at the relatively high speed of playback capstan 22.

The reason for having two solenoids 90 and 92 is to assure instant start with minimum power consumption.

The solenoid 90 comprises a coil having a relatively small number of turns made up of a relatively heavy wire, whereas to have a low time constant, while the adjacent solenoid 92 has a relatively long time constant due to having a coil of relatively fine wire but of relatively large number of turns. The solenoid 90 is identified as the start solenoid, while the solenoid 92 is known as the hold solenoid. In practice, the solenoids 90 and 92 are operated in succession, current buildup being exceedingly rapid in the start solenoid and relatively slow in the hold solenoid. Use of solenoid 90 assures tape movement almost instantaneously with incoming signals. On the other hand, since it takes less force to hold the armature than it does to move it initially, use of hold solenoid 92 in substitution of start solenoid 90 permits conservation of power. The response time of the solenoid 94 is not critical since the problem of avoiding loss of incoming signals does not exist with respect to playback.

To the extent already described, operation of the tape transport system is straightforward. Let it be assumed that the armature is moved clockwise so that pinch roller 88 pinches tape against capstan 24. When this occurs, the capstan will urge the tape in the direction of reel 4, causing spring 48 to contract and spring 50 to elongate with the result that carriage 42 will shift to the left. The length of tape between reel 2 and roller 30 constitutes an auxiliary tape reservoir which permits movement of tape past the magnetic head 54 before reel 2 is up to operating speed. The movement of carriage 42 permitted by spring 50 allows roller 36 to take up any temporary slack caused by movement of tape past the head 54 before the reel 4 has reached operating speed.

For the purposes of the present invention, it is preferred that when the armature arm is balanced with precisely the same spacing between the capstans 22 and 24 and their pinch rollers 86 and 88, the gaps between the armature and the pole faces of each of the solenoids also are identical. The present invention also requires that the normal balanced spacing between the pinch rollers and the capstans be substantially larger than the thickness of the tape to be accommodated. On the other hand, the normal balanced spacing between the pinch rollers and the capstans should be small enough to allow the armature to pivot to the extent necessary for their pinch rollers to squeeze tape tight against the capstans so that the latter can cause tape movement without slippage. In the preferred embodiment, when the armature is balanced, the gap between it and each solenoid is 0.005 inch and the spacing between each pinch roller and the adjacent capstan is .002 inch. The thickness of the tape is approximately .0005 inch.

With this arrangement, the force exerted on the tape when driven by either capstan might cause it to break when its end is reached except for the novel means hereafter described which cause movement of the tape to terminate automatically before any rupture can occur.

According to the present invention, the end of the tape is spliced by a thin splicing tape S to a special strong resilient leader L which is anchored to a reel, in this case, reel 2. Although only one is shown, it is to be understood that either or both ends of the tape may have a leader. This leader L is special in that it has a thickness substantially larger than the thickness of the tape. In the preferred embodiment, splicing tape S has the same thickness of tape T while the leader has a thickness of .002 inches which is four times the thickness of tape T and is equal to the gap between the pinch rollers and the capstans when the armature is in balanced position. Additionally, the leader is lubricated on the side which comes into contact with the capstans 22 and 24. In the preferred embodiment, the tape leader is coated with graphite. The character of the graphite is such that, even with no change in the force exerted by the pinch roller, some slippage will begin to occur as soon as the tape leader comes into contact with the capstan. Depending upon the force exerted by the pinch roller, the resulting slippage may or may not be sufficient to cause rapid deceleration of the tape T by pad 56 while the leader is still unwinding from the reel to which it is attached. However, sufficient slippage is assured by the relatively large thickness of the leader which causes a material reduction in the force exerted by the pinch roller. How this is achieved is easily explained. Assume that pinch roller 88 is pinching tape against capstan 24 so that the tape is being moved from reel 2 to reel 4. When the leader L passes between pinch roller 88 and tape driving capstan 24, the thickness of the leader (especially noticeable at the splice where the combined thickness of tape and leader is 0.0030 inch) will cause the armature to move away from the driving capstan, thereby increasing the gap between the armature and the pole piece of the energized solenoid 92. Increasing the gap between the armature and the solenoid 92 places the former in a weaker portion of the magnetic field of the latter, with a consequent decrease in the magnetic attraction of the armature to the solenoid and a reduction in the force with which the tape leader is squeezed against capstan 24 by pinch roller 88. The drop in friction occurs sharply, causing the tape to decelerate rapidly under the drag exerted by pad 56 and to come to a stop with the leader unwound to the extent permitted by reel 2. Because of the relatively low friction between capstan 24 and the tape leader, any restraining force exerted by the reel in opposition to the driving force of the capstan is relatively small and well within the breaking strength of the tape and the tape leader. Therefore, no rupture will occur and the tape will stand ready for playback and reuse. In this connection, it is to be understood that subsequent energization of solenoid 94 will cause reverse movement of the tape notwithstanding the fact that the leader is lubricated. Reverse movement occurs because solenoid 94 is adapted to force pinch roller 86 to pinch the leader with sufficient pressure to cause capstan 22 to overcome the drag exerted by pad 56. As soon as solenoid 94 is energized, the tape will start to move in the direction of reel 2, with the tape speed accelerating relatively fast even while the leader is in contact with the capstan. Solenoid 94 is made to exert a force sufficient to cause capstan 22 to drive the lubricated leader by appropriate design of its coil and/or by its location relative to the pivot 84. It is to be observed that solenoid 94 is spaced further from pivot 84 than is solenoid 92. Therefore, even if identical in design and applied voltage, solenoid 94 will have a greater leverage than solenoid 92 and pinch roller 86 will press against capstan 22 with greater force than will pinch roller 88 on capstan 24 in response to solenoid 92. By the same token, solenoid 90 will cause pinch roller 88 to press against capstan 24 with greater force than can solenoid 92. Accordingly, since forward movement of tape T is initiated by solenoid 90, use of a lubricated leader on the leading end of the tape T is fully as satisfactory as a leader on the trailing end as herein described.

Although not shown, it is to be understood that the recorder may have automatic means for reversing movement of the tape after one end or the other is reached. These automatic means may be electrically or mechanically operated without departing from the invention. Alternatively, forward or reverse movement may be initiated by manually operated switches.

Although as described the invention utilizes graphite, it is to be understood that the invention is not limited to any particular lubricant for the tape leader. Thus, for example, the leader may be coated with a low-friction silicone or tetrafluoroethylene resin.

Obviously, many other modifications and variations of the invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

What is claimed is:

1. In combination with a tape transport system having a tape driving capstan, a solenoid comprising a pole piece, a movable armature with a pinch roller attached thereto, said pinch roller movable toward said capstan as said armature is attracted to said pole piece and said armature movable away from said pole piece as said pinch roller is moved away from said capstan, and a supply of tape mounted for transmission by said capstan; the improvement comprising a tape leader for said tape having a thickness substantially throughout the length of the leader much greater than that of said tape, whereby upon movement of said leader between said capstan and said pinch roller at a time when said solenoid is energized, said pinch roller will be forced away from said capstan and said armature will move away from said pole piece, with a consequent reduction in the magnetic force urging said pinch roller toward said capstan, the reduction in magnetic force being sufficient to allow slippage between said leader and said capstan.

2. The combination of claim 1 wherein said leader is lubricated on the side which engages said capstan, whereby to promote better slippage relative to said capstan.

3. The combination of claim 1 wherein said tape is mounted on two reels, and further including means for driving said capstan and means for driving said reels while said capstan is operating but only when said tape is subject to a capstan-applied transmitting force.

4. Magnetic tape apparatus comprising a motor, a pair of capstans, means for driving said capstans continuously so long as said motor is operating, a pinch roller assembly comprising an armature movable in either of two predetermined directions, a pair of pinch rollers attached to said armature, one pinch roller movable toward one of said capstans when said armature moves in one of said two directions and the other pinch roller movable toward the other of said capstans when said armature moves in the other of said two directions, first means for electromagnetically moving said armature in said one direction, second means for electromagnetically moving said armature in said other direction, a supply of magnetic tape interposed between said capstans and pinch rollers, means mounting said supply of tape for transmission by either of said capstans when pinched against said either capstan by the pinch roller associated therewith, and a leader attached to the end of said tape, said leader being lubricated on the side thereof which contacts said capstans, whereby when said leader reaches said either capstan, sufficient slippage will occur to allow said tape to come to a halt even while said either capstan continues to rotate.

5. Magnetic tape apparatus as defined by claim 4 wherein said first and second means are solenoids having pole faces with a gap between each face and said armature, and further wherein said leader has a thickness substantially greater than that of said tape whereby when said leader moves between said either capstan and the pinch roller associated therewith, its greater thickness will cause said armature to move in a direction to increase the gap between it and the solenoid energizing it, with a consequent decrease in the magnetic force which urges said associated pinch roller toward said either capstan.

References Cited by the Examiner

UNITED STATES PATENTS

| | | | |
|---|---|---|---|
| 1,210,955 | 1/1917 | Langcheck | 242—67.4 |
| 2,561,602 | 7/1951 | Valentino et al. | 242—57 X |
| 2,631,789 | 3/1953 | Watterlohn | 242—54.1 |
| 2,778,636 | 1/1957 | Eash. | |
| 2,833,538 | 5/1958 | Namenyi-Katz | 226—50 |
| 2,834,928 | 5/1958 | Carter | 242—57 |
| 2,891,736 | 6/1959 | Blaes | 242—55.12 |
| 2,900,142 | 8/1959 | Sprinkle | 242—55.12 |
| 2,912,899 | 11/1959 | Wangerin et al. | 242—71.1 |
| 2,923,642 | 2/1960 | Hausen | 117—68 |
| 2,943,852 | 7/1960 | Quirk | 226—50 |
| 2,959,334 | 11/1960 | Uritis | 226—176 |

(Other references on following page)

UNITED STATES PATENTS

| | | | |
|---|---|---|---|
| 2,996,229 | 8/1961 | Loewe | 226—50 |
| 3,002,671 | 10/1961 | Brumbaugh et al. | 226—176 |
| 3,022,960 | 2/1962 | Foster | 242—75.3 |
| 3,025,017 | 3/1962 | Wahlstrom | 242—75.3 |
| 3,029,033 | 4/1962 | Loewe et al. | 242—55.12 |
| 3,032,613 | 5/1962 | Namenyi-Katz | 242—55.13 X |
| 3,052,567 | 9/1962 | Gabor et al. | 117—76 |
| 3,075,682 | 1/1963 | Hebb | 226—176 |
| 3,115,314 | 12/1963 | Manley et al. | 242—55.12 |

FOREIGN PATENTS

| | | |
|---|---|---|
| 716,632 | 10/1954 | Great Britain. |

MERVIN STEIN, *Primary Examiner.*

HARRISON R. MOSELEY, *Examiner.*